United States Patent
Harada et al.

(10) Patent No.: US 12,356,459 B2
(45) Date of Patent: Jul. 8, 2025

(54) TERMINAL AND BASE STATION FOR INDICATING A RESOURCE SET TO BE TRIGGERED TO ENHANCE SYSTEM FREQUENCY UTILIZATION

(71) Applicant: NTT DOCOMO, INC., Tokyo (JP)

(72) Inventors: Hiroki Harada, Tokyo (JP); Shohei Yoshioka, Tokyo (JP); Shinya Kumagai, Tokyo (JP); Daisuke Kurita, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 361 days.

(21) Appl. No.: 17/758,789

(22) PCT Filed: Feb. 12, 2020

(86) PCT No.: PCT/JP2020/005419
§ 371 (c)(1),
(2) Date: Jul. 15, 2022

(87) PCT Pub. No.: WO2021/161434
PCT Pub. Date: Aug. 19, 2021

(65) Prior Publication Data
US 2023/0039325 A1 Feb. 9, 2023

(51) Int. Cl.
*H04W 72/231* (2023.01)
*H04B 7/06* (2006.01)
(Continued)

(52) U.S. Cl.
CPC .... *H04W 74/0833* (2013.01); *H04B 7/06966* (2023.05); *H04L 5/0048* (2013.01);
(Continued)

(58) Field of Classification Search
CPC ............ H04B 7/0626; H04B 7/06966; H04W 36/13; H04W 36/0083; H04W 72/231;
(Continued)

(56) References Cited

U.S. PATENT DOCUMENTS

2017/0359746 A1* 12/2017 Lee ................... H04B 7/0626
2019/0356444 A1* 11/2019 Noh ................... H04W 72/23
(Continued)

FOREIGN PATENT DOCUMENTS

WO 2020/008644 A1 1/2020

OTHER PUBLICATIONS

R1-1817669, "Cell reselection with FR1 cells and FR2 cells on the same priority", Nov. 12-16, 2018, pp. 1-3 (Year: 2018).*
(Continued)

*Primary Examiner* — Salvador E Rivas
(74) *Attorney, Agent, or Firm* — Osha Bergman Watanabe & Burton LLP

(57) ABSTRACT

A terminal includes a receiving unit that receives control information transmitted on a second cell, the control information including information used to assign a resource for a downlink shared channel reception or a resource for an uplink shared channel transmission in a first cell; and a control unit that determines at least one of a measurement of a channel state information reference signal (CSI-RS), a measurement of a tracking reference signal (TRS), a transmission of a sounding reference signal (SRS), or a transmission of a physical random access channel (PRACH) is triggered, regardless of a content of information other than the information used to assign the resource included in the control information.

4 Claims, 6 Drawing Sheets

(51) Int. Cl.
  *H04L 5/00*      (2006.01)
  *H04L 12/413*    (2006.01)
  *H04W 36/00*     (2009.01)
  *H04W 74/0833*   (2024.01)
  *H04L 27/26*     (2006.01)

(52) U.S. Cl.
  CPC ....... *H04L 12/413* (2013.01); *H04W 36/0083* (2013.01); *H04W 72/231* (2023.01); *H04B 7/0626* (2013.01); *H04L 27/2692* (2013.01)

(58) Field of Classification Search
  CPC ............ H04W 74/008; H04W 74/0833; H04L 12/413; H04L 27/2692
  See application file for complete search history.

(56) References Cited

U.S. PATENT DOCUMENTS

| | | | |
|---|---|---|---|
| 2021/0185694 A1* | 6/2021 | Hua | H04W 24/08 |
| 2022/0053356 A1* | 2/2022 | Hu | H04W 24/10 |
| 2022/0131583 A1* | 4/2022 | Lee | H04B 7/0643 |
| 2022/0150734 A1* | 5/2022 | Nimbalker | H04L 1/0038 |

OTHER PUBLICATIONS

International Search Report issued in PCT/JP2020/005419, mailed on Sep. 15, 2020 (5 pages).
Written Opinion of the International Searching Authority issued in PCT/JP2020/005419, mailed on Sep. 15, 2020 (3 pages).
NTT DOCOMO, Inc; "White Paper 5G Evolution and 6G"; Jan. 2020 (17 pages).
3GPP TS 38.213 V16.0.0; "3rd Generation Partnership Project; Technical Specification Group Radio Access Network; NR; Physical layer procedures for control (Release 16)"; Dec. 2019 (146 pages).
3GPP TS 38.133 V16.2.0; "3rd Generation Partnership Project; Technical Specification Group Radio Access Network; NR; Requirements for support of radio resource management (Release 16)"; Dec. 2019 (1129 pages).
Extended European Search Report issued in European Application No. 20919187.3, mailed Oct. 26, 2023 (8 pages).

* cited by examiner

TERMINAL AND BASE STATION FOR INDICATING A RESOURCE SET TO BE TRIGGERED TO ENHANCE SYSTEM FREQUENCY UTILIZATION

TECHNICAL FIELD

The present invention relates to a terminal and a base station in a radio communication system.

BACKGROUND ART

A study on a sixth generation mobile communication technology (which is referred to as Beyond 5G, 5G evolution, 6G, or the like) has been started domestically and internationally, targeting 2025 and beyond. For example, Ministry of Science and Technology of China has announced in November 2019 that genuine research and development of 6G have been started.

As candidates for study items for Beyond 5G and 6G, for example, the following study items have been assumed.

To develop a new frequency band. For example, a frequency band higher than or equal to 100 GHz, a terahertz band, and the like may be studied to newly develop as a 6G frequency band.

To achieve a higher data rate in the existing 5G frequency band (which is lower than or equal to 100 GHz). Specifically, narrowing of beams, cooperative transmission and reception among base stations, cooperative transmission and reception among terminals, and the like may be studied.

Reduction of power consumption of a mobile terminal, a mobile base station, and the like may be studied, and implementation of long-term use of a mobile terminal, a mobile base station, and the like without recharging may be studied.

RELATED ART DOCUMENT

Non-Patent Document

Non-Patent Document 1: White Paper 5G Evolution and 6G, NTT DOCOMO, INC, January 2020
Non-Patent Document 2: 3GPP TS 38.213 V16.0.0 (2019-12)
Non-Patent Document 3: 3GPP TS 38.133 V16.2.0 (2019-12)

SUMMARY OF THE INVENTION

Problem to be Solved by the Invention

Channel mapping, an operation, or the like in the current NR technical specifications are not optimized for discontinuous transmission/reception in a short period of time, and an overhead for using a high frequency band (extra ON time) may be large.

There is a need for a technique that enables discontinuous transmission and reception with low time overhead and high frequency utilization efficiency, reduces terminal power consumption, and enhances system frequency utilization efficiency.

Means for Solving the Problem

According to an aspect of the present invention, there is provided a terminal including a receiving unit that receives control information transmitted on a second cell, the control information including information used to assign a resource for a downlink shared channel reception or a resource for an uplink shared channel transmission in a first cell; and a control unit that determines at least one of a measurement of a channel state information reference signal (CSI-RS), a measurement of a tracking reference signal (TRS), a transmission of a sounding reference signal (SRS), or a transmission of a physical random access channel (PRACH) is triggered, regardless of a content of information other than the information used to assign the resource included in the control information.

Advantage of the Invention

According to an embodiment, there is provided a technique that enables discontinuous transmission and reception with low time overhead and high frequency utilization efficiency, reduces terminal power consumption, and enhances system frequency utilization efficiency.

EMBODIMENTS OF THE INVENTION

Hereinafter, an embodiment of the invention will be described with reference to the accompanying drawings. Note that, the following embodiment is illustrative only, and embodiments to which the invention is applied are not limited to the following embodiments.

It is assumed that a radio communication system in the following embodiments basically conform to NR, but this is merely an example, and the radio communication system in the embodiments may partially or entirely conform to a radio communication system (for example, LTE) other than the NR.

(Overall System Configuration)

Figure 1:
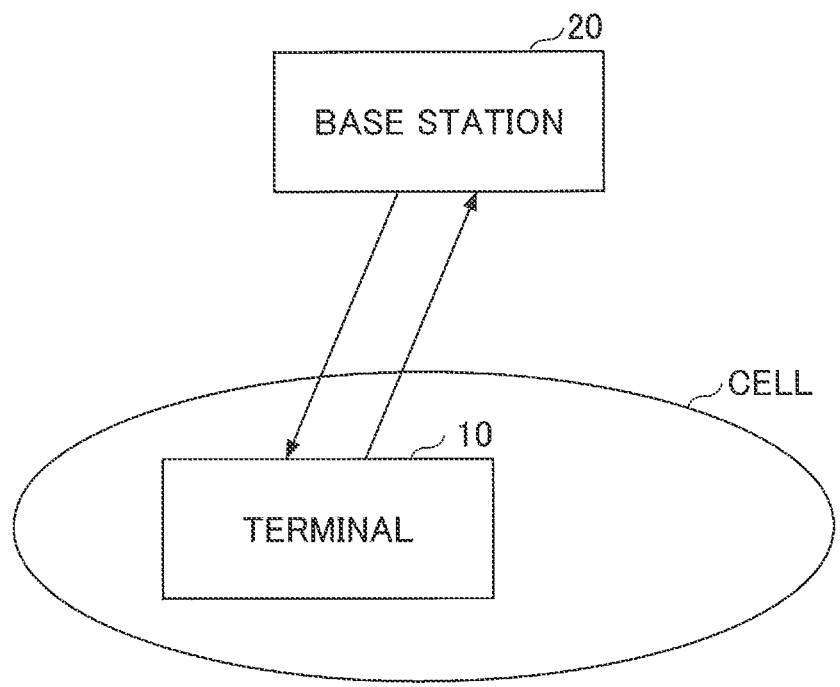
FIG. 1 is a configuration diagram of a communication system in an embodiment.

FIG. 1 illustrates a configuration diagram of the radio communication system according to the embodiments. As illustrated in FIG. 1, the radio communication system according to the embodiments includes a terminal 10 and a base station 20. In FIG. 1, one piece of the terminal 10 and one piece of the base station 20 are illustrated, but this is an example, and a plurality of the terminals 10 and a plurality of the base stations 20 may be provided.

The terminal 10 is a communication device such as a smart phone, a portable telephone, a tablet, a wearable terminal, and a communication module for machine-to-machine (M2M) which have a radio communication function. The terminal 10 receives a control signal or data from the base station 20 in DL, and transmits the control signal or the data to the base station 20 in UL to use various communication services provided by the radio communication system. For example, a channel transmitted from the terminal 10 includes a physical uplink control channel (PUCCH) and a physical uplink shared channel (PUSCH). In addition, the terminal 10 may be referred to as a UE, and the base station 20 may be referred to as a gNB.

In the embodiments, a duplex method may be a time division duplex (TDD) method or a frequency division duplex (FDD) method.

In addition, in the embodiments of the present invention, "configuring" or "specifying" a radio parameter or the like may mean that a predetermined value is pre-configured for the base station 20 or the terminal 10, a predetermined value is expected to be preconfigured for the base station 20 or the terminal 10, or a predetermined value is configured based on a radio parameter indicated by the base station 20 or the terminal 10.

The base station 20 is a communication device that provides one or more cells and that performs radio communication with the terminal 10. Physical resources of a radio signal are defined in a time domain and a frequency domain, the time domain may be defined by a number of OFDM symbols (slots, subframes, symbols, time resources shorter than symbols, or the like), and the frequency domain may be defined by a number of sub-carriers or a number of resource blocks. The base station 20 transmits synchronization signals and system information to the terminal 10. The synchronization signals are, for example, NR-PSS and NR-SSS. A part of the system information is transmitted, for example, by NR-PBCH, and is also called broadcast information. The synchronization signal and broadcast information may be periodically transmitted as an SS block (SS/PBCH block) formed of a predetermined number of OFDM symbols. For example, the base station 20 transmits a control signal or data in Downlink (DL) to the terminal 10 and receives a control signal or data in Uplink (UL) from the terminal 10. Both the base station 20 and the terminal 10 are capable of beam forming to transmit and receive signals. For example, a reference signal transmitted from the base station 20 includes a Channel State Information Reference Signal (CSI-RS) and a channel transmitted from the base station 20 includes a Physical Downlink Control Channel (PDCCH) and a Physical Downlink Shared Channel (PDSCH).

(Multi-Numerology)

In order to support a wide range of frequencies and use cases in 5G, it is necessary to support multiple numerologies (radio parameters such as a subcarrier spacing and a symbol length). Accordingly, it is effective to design variable parameters in a scalable manner on the basis of LTE numerology. Based on this idea, Multi-Numerology of NR has been introduced. Specifically, the reference subcarrier spacing is the same as the LTE subcarrier spacing, and is set to 15 kHz. Other subcarrier spacings are defined by multiplying the reference subcarrier spacing by a power of 2. A plurality of subcarrier spacing configurations $\mu$ are defined. Specifically, for $\mu=0$, the subcarrier spacing $\Delta f=15$ kHz and Cylic prefix=Normal may be specified; for $\mu=1$, the subcarrier spacing $\Delta f=30$ kHz and Cyclic prefix=Normal may be specified; for $\mu=2$, the subcarrier spacing $\Delta f=60$ kHz and Cyclic prefix=Normal or Extended may be specified; for $\mu=3$, the subcarrier spacing $\Delta f=120$ kHz and Cylic prefix=Normal may be specified; and for $\mu=4$, the subcarrier spacing $\Delta f=240$ kHz and Cyclic prefix=Normal may be specified.

The number of OFDM symbols included in one slot is set to 14 for any of the subcarrier spacing configurations $\mu=0$, 1, 2, 3, and 4. However, for the subcarrier spacing configurations $\mu=0$, 1, 2, 3, and 4, the number of slots included in one frame is set to 10, 20, 40, 80, and 160, and the number of slots included in one sub-frame is set to 1, 2, 4, 8, and 16. Here, since the frame length is 10 ms, for the subcarrier spacing configurations $\mu=0$, 1, 2, 3, and 4, the slot lengths are set to 1 ms, 0.5 ms, 0.25 ms, 0.125 ms, and 0.625 ms. Since the number of OFDM symbols included in one slot is set to 14 for any of the subcarrier spacing configurations $\mu=0$, 1, 2, 3, and 4, the OFDM symbol lengths differ for every subcarrier spacing configurations. For the subcarrier spacing configurations $\mu=0$, 1, 2, 3, and 4, the OFDM symbol lengths are set to (1/14) ms, (0.5/14) ms, (0.25/14) ms, (0.125/14) ms and (0.0625/14) ms. As described above, by shortening the slot length and the OFDM symbol length, low-latency communication can be achieved. For example, the base station 20 can configure the subcarrier spacing for the terminal 10 by specifying any of $\mu=0$, 1, 2, 3, and 4 in a subcarrier spacing that is a parameter of an information element BWP.

Figure 2:
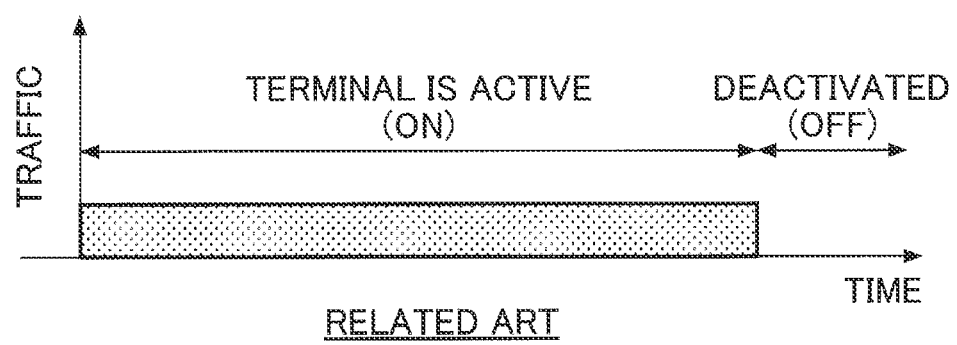
FIG. 2 is a diagram illustrating an example of relation between time and traffic in a radio communication technology according to related art.

For example, FIG. 2 is a diagram illustrating an example of the relationship between time and communication volume according to the radio communication technology according to related art. As illustrated in the example of FIG. 2, when the attainable data rate is not so high (for example, lower than or equal to 1 Gbps), the time to make the terminal 10 active (ON), when communication traffic occurs, is considered to be a certain length of time, which may be longer than or equal to several hundred ms, for example.

Figure 3:
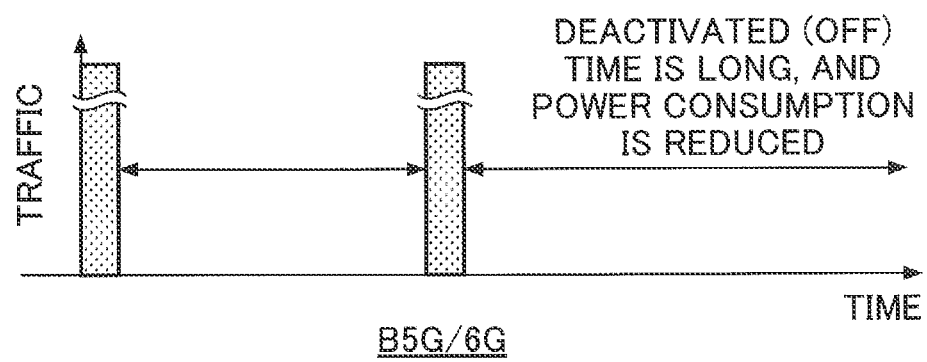
FIG. 3 is a diagram illustrating an example of relation between time and traffic in a radio communication technology that can achieve a high data rate.

In contrast, as illustrated in FIG. 3, for example, when the attainable data rate is high (for example, higher than or equal to 10 Gbps), it is expected that the communication is completed in a short period of time and, thus, during a longer time period other than the short time, communication is not performed. Accordingly, as illustrated in the example of FIG. 3, the time for making the terminal 10 active (ON), when communication traffic occurs, is considered to be shorter than or equal to several tens of ms, for example.

(SCell Activation Delay)

Figure 4:
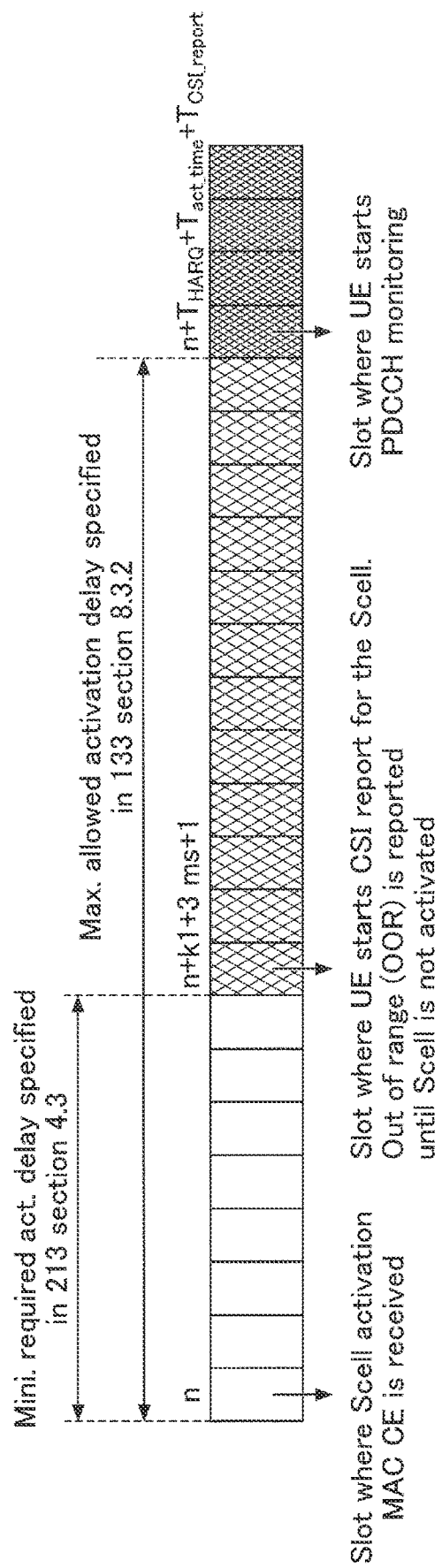
FIG. 4 is a diagram illustrating an example of SCell activation delay.

FIG. 4 is a diagram illustrating an example of the Secondary Cell (SCell) activation delay of release 15/16 NR. As illustrated in FIG. 4, for example, after the terminal 10 receives an activation command for setting the SCell in the deactivated state (a state in which the terminal 10 is not performing PDCCH monitoring and CSI measurement/reporting) to the activated state (a state in which the terminal 10 can receive the PDCCH), it takes at least k1+3 ms+1 slot (the time for the terminal 10 to return HARQ feedback for PDSCH including the activation command+3 ms+1 slot) to return the SCell from the deactivated state to the activated state. As a requirement in a technical specification, it is specified that SCell activation may take longer time, including margins, such as a time until receiving an SSB resource and a CSI measurement resource for the next time and a time for reconfiguring a reception beam.

In 4G (LTE) and 5G (NR), the terminal transitions between states, such as a connected state (connected), a discontinuous reception mode (C-DRX: connected mode discontinuous reception), an inactive state (inactive), and an idle state (idle), according to presence or absence of traffic/ communication, and switches between a low latency and a low power consumption according to the circumstances.

For a secondary cell (SCell) at a time of carrier aggregation (CA), a state, such as activated/deactivated state, is similarly specified.

In a work item for Release 16 power saving, a function has been supported, which can be used for simply transmitting, by a wake-up signal (WUS), a notification of whether the terminal 10 needs to wake up for on-duration during DRX.

Furthermore, in a work item for the extension of Release 16 Multi-RAT Dual Connectivity (MR/DC), an SCell dormancy state has been specified, as a state from which the SCell can quickly return to the activated state, compared to the deactivated state. A switching notification function has been supported, which is for changing a state of an SCell to the dormancy state.

In the connected state, the activated state, and the dormancy state of the SCell, a reference signal is periodically (or aperiodically) measured and CSI measurement and/or time-frequency tracking is performed to prepare for data transmission and reception.

In the deactivated state of the SCell, measurement of a reference signal, measurement of CSI, and time frequency tracking are not performed. Accordingly, there is latency in returning from the deactivated state to the activated state.

(Problem)

If a peak data rate of transport block transmission by the terminal 10 is very high compared to the amount of traffic generated per unit time, it is desirable to compress the communication time by the terminal 10 as much as possible and turn off the radio circuit completely for the remaining time.

In particular, it is desirable to be able to turn off the radio circuit for the high frequency band used to achieve a high peak throughput.

However, while the radio circuit is turned off, the terminal 10 is not able to do anything at that frequency, and, when the radio circuit is turned on again, latency may occur before the terminal 10 can start transmitting and receiving, due to synchronization, tracking, beam control, automatic gain control (AGC), and the like.

Connections in the high frequency band tend to fail more often in comparison to connections in the low frequency band due to propagation attenuation, blocking, or the like, and, thus, the high frequency band may not be suitable for performing control communication.

Accordingly, it can be considered to use a carrier in the low frequency band for control, and a carrier in the high frequency band for data transmission.

For example, it can be considered, for example, to transmit and receive DCI/UCI on a carrier in the low frequency band and transmit only PDSCH/PUSCH on a carrier in the high frequency band by applying cross-carrier scheduling of CA.

In this scenario, for example, in the terminal 10, the radio circuit for the low frequency band is always turned on and the control signal is continuously monitored, and the radio circuit for the high frequency band can be turned off, except for the timing at which there is data traffic.

However, the channel mapping, operation, or the like in the current NR technical specifications are not optimized for discontinuous transmission/reception in a short period of time, and the overhead for using the high frequency band (extra ON time) may be large. As an example of the overhead, activation delay of the deactivated SCell can be considered.

(Proposal)

For a first serving cell for which cross-carrier scheduling is configured and PDCCH monitoring is not configured, the terminal 10 may expect that an operation corresponding to the first serving cell is not to be performed, unless a PDSCH reception or a PUSCH transmission resource for the first serving cell is assigned by control information (e.g., DCI) transmitted on a second serving cell (i.e., a serving cell other than the first serving cell). Only the radio resource management (RRM) measurement may be performed according to a configuration from the base station 20, but the terminal 10 does not expect that operations related to periodic signal transmission other than the RRM measurement are configured.

For example, the terminal 10 may perform only the RRM measurement according to the configuration from the base station 20, but the terminal 10 need not expect that operations related to periodic signal transmission other than the RRM measurement are configured. Alternatively, the terminal 10 may only perform the RRM measurement based on the reference signal transmission/reception (a sounding reference signal (SRS), a channel state information reference signal (CSI-RS), or the like) at the time of data allocation without performing the RRM measurement during the period when there is no data allocation. Alternatively, the terminal 10 may only perform L1 measurement (it is not necessary to assume that L3 measurement is configured for the frequency of the first serving cell). For example, an RS of a neighboring cell may be set as a measurement target of the L1 measurement.

For example, the base station 20 may configure the terminal 10 to perform only RRM measurement; not to perform the RRM measurement and operations related to periodic signal transmission and reception other than the RRM measurement; or to perform only L1 measurement.

For example, for a first serving cell for which cross-carrier scheduling is configured and PDCCH monitoring is not configured only in a specific frequency band and/or under a specific condition, the terminal 10 may expect that an operation corresponding to the first serving cell is not to be performed, unless a PDSCH reception resource or a PUSCH transmission resource is assigned by control information (e.g., DCI) transmitted on a second serving cell (i.e., a serving cell other than the first serving cell). Only the radio resource management (RRM) measurement may be performed according to a configuration from the base station 20, but the terminal 10 does not expect that an operation related to periodic signal transmission and reception other than the RRM measurement is to be configured.

For example, the terminal 10 may apply the above-described operation only on a secondary cell (SCell) in a high frequency band higher than or equal to a predetermined frequency. For example, the high frequency band higher than or equal to the predetermined frequency may be a frequency band higher than the frequency band of FR2, in the frequency range formed of a Frequency Range 1 (FR1), which is a low frequency band, and the Frequency Range 2 (FR2), which is a high frequency band, of NR.

In this case, the base station 20 may be able to configure the terminal 10 to apply the above-described operation (performing only RRM measurement only on the SCell in the high frequency band higher than or equal to the predetermined frequency; not performing the RRM measurement and an operation related to periodic signal transmission and reception other than the RRM measurement; or performing only the L1 measurement). The terminal 10 may be able to transmit, to the base station 20, a notification of capability indicating whether the above-described operation is applicable (e.g., performing only RRM measurement only on the SCell in the high frequency band higher than or equal to the predetermined frequency; not performing the RRM measurement and an operation related to periodic signal transmission and reception other than the RRM measurement; or performing only the L1 measurement).

Here, for example, the following condition 1 may be applied to the terminal 10.

(Condition 1)

For a first serving cell for which cross-carrier scheduling is configured and PDCCH monitoring is not configured, it is assumed that the terminal 10 expects that an operation corresponding to the first serving cell is not to be performed, unless a PDSCH reception resource or a PUSCH transmission resource for the first serving cell is assigned by control information (e.g., DCI) transmitted on a second serving cell (i.e., a serving cell other than the first serving cell). Only the radio resource management (RRM) measurement may be performed according to a configuration from the base station 20, but the terminal 10 does not expect that an operation related to periodic signal transmission and reception other than the RRM measurement is configured.

In this case, suppose that a PDSCH reception resource or a PUSCH transmission resource for the first serving cell is assigned to the terminal 10 by the control information (e.g., DCI) transmitted on the second serving cell. At this time, even if the control information does not include a specific indication to trigger at least one of measurement (or transmission) of an A-CSI-RS (aperiodic CSI-RS), measurement (or transmission) of an A-TRS (aperiodic tracking reference signal), measurement (or transmission) of an A-SRS (aperiodic sounding reference signal), or transmission of a Physical Random Access Channel (PRACH), the terminal 10 may determine (assume) that at least one of the measurement (or transmission) of the A-CSI-RS (aperiodic CSI-RS), the measurement (or transmission) of the A-TRS (aperiodic tracking reference signal), the measurement (or transmission) of the A-SRS (aperiodic sounding reference signal), or the transmission of the Physical Random Access Channel (PRACH) is triggered.

In this case, the control information (e.g., DCI) may include indication information, such as information indicating a resource set to be triggered (for example, an SRS resource indicator). Alternatively, one or more of the above may be triggered (ON/OFF) based on the indication information included in the control information (e.g., DCI), such as information indicating a resource set to be triggered (for example, an SRS resource indicator). That is, one or more of the above may be explicitly triggered.

Figure 5:
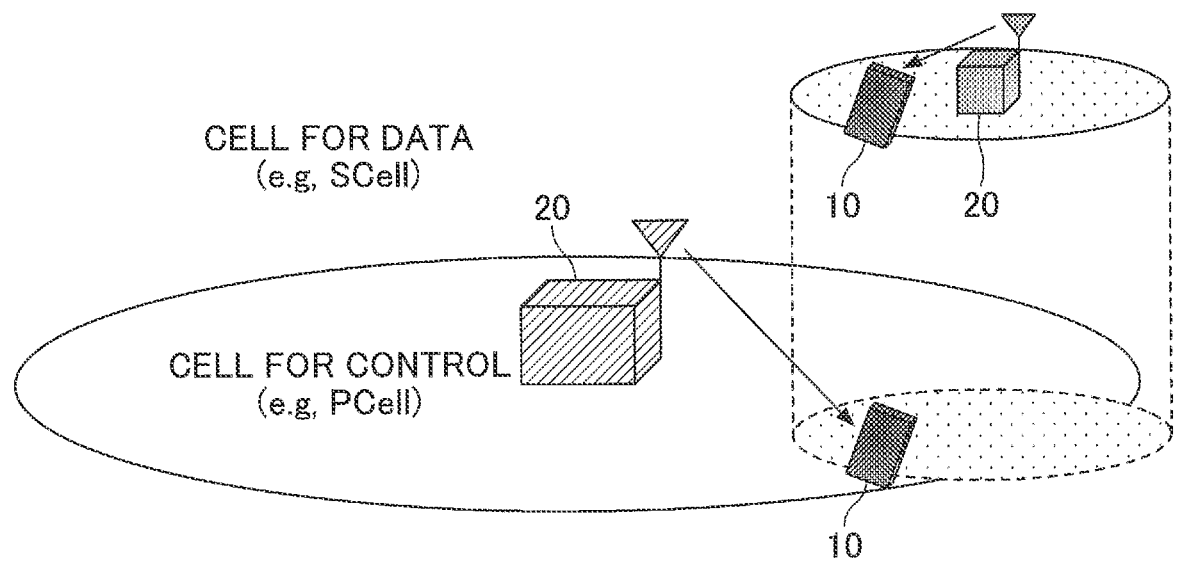
FIG. 5 is a diagram illustrating an example of operations of a terminal and a base station in a case where a condition 1 is applied.
Figure 6:
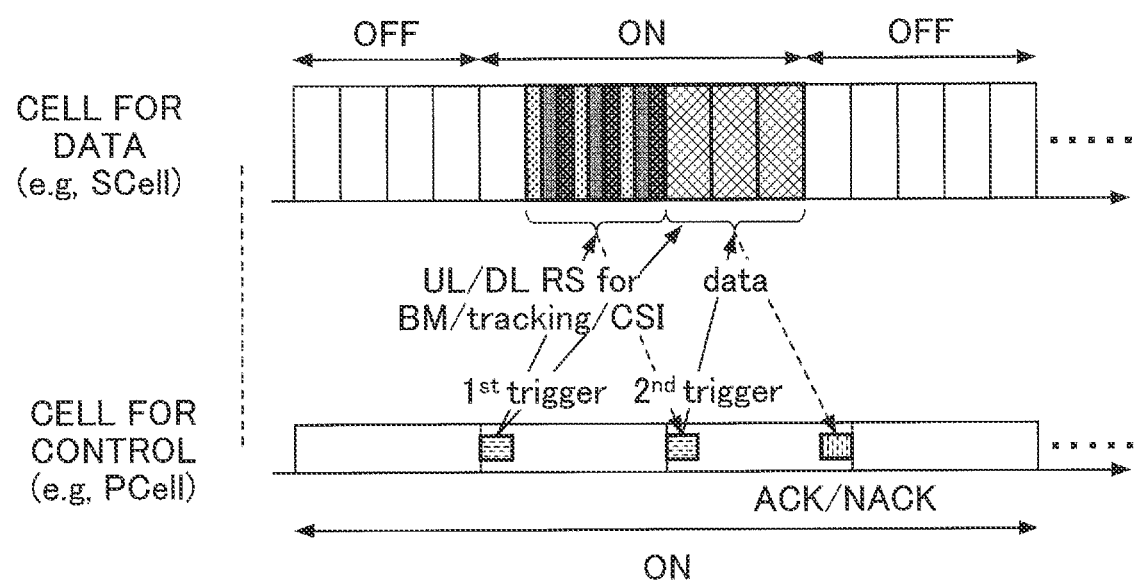
FIG. 6 is a diagram illustrating an example of operations of the terminal and the base station in the case where the condition 1 is applied.

FIG. 5 and FIG. 6 are diagrams illustrating examples of operations of the terminal and the base station when the condition 1 is applied.

(Example of an Operation for DL Data Communication)

For example, in the system configuration illustrated in FIG. 5, scheduling of DL data communication on a data cell is performed for the terminal 10 by using DCI from a control cell. Subsequently, the terminal 10 transmits an A-SRS to the data cell, and the base station 20 estimates a beam and/or CSI based on the reciprocity of the radio wave propagation path. By receiving an A-CSI-RS, an A-TRS, or the like, the terminal 10 performs synchronization, tracking, and beam estimation (the order of UL RS and DL RS may be reversed). Subsequently, the terminal 10 receives DL data from the data cell. Furthermore, a notification of the result of the estimation of the beam and CSI based on the reciprocity may be transmitted from the base station 20 in the second DCI, and the terminal 10 may update the configuration based on the 2nd DCI. Subsequently, the terminal 10 transmits ACK/NACK to the control cell. The "control cell" in the above-described example may be a PCell, and the "data cell" may be an SCell. Furthermore, in a case where the terminal 10 receives multiple control information items related to one or more continuous transport blocks, the second DCI may be the second item (or the item after the second item) from among the multiple control information items for scheduling the one or more continuous transport blocks.

In a case of UL data communication, for example, an operation in which the terminal 10 transmits a Scheduling Request (SR) on the control cell and an operation in which the terminal 10 transmits a PRACH on the data cell may be added to the start of the above-described example of the operation in the case of the DL data communication.

In the above-described condition 1, the first serving cell may be an SCell. In this case, the terminal 10 to which the above-described condition 1 is applied may expect that at least one of A-SRS, A-CSI-RS, A-TRS, or PRACH is assigned before (within a predetermined time range) the PDSCH/PUSCH resource in the SCell based on the assignment of the PDSCH/PUSCH resource (for example, when a PDSCH/PUSCH resource is assigned with a predetermined time interval or more from the previous PDSCH/PUSCH resource assignment). Alternatively, the terminal 10 may expect that a periodic resource is preconfigured for the terminal 10, and at least one of A-SRS, A-CSI-RS, A-TRS, or PRACH may be assigned in the periodic resource. When PDSCH/PUSCH is assigned to the carrier A, the terminal 10 may expect that at least one of A-SRS, A-CSI-RS, A-TRS, or PRACH is assigned to another carrier B. The control information (e.g., DCI) may include an indication indicating the carrier to be scheduled, in addition to the cell (carrier) scheduled by the control information. Correspondence between a cell (carrier) scheduled by the control information and a cell (carrier) to be scheduled other than the scheduled cell may be configured by RRC signaling or the like.

Alternatively, the terminal 10 to which the above-described condition 1 is applied may autonomously set the timing for activating the SCell, perform UL transmission using a preconfigured resource/preamble or the like, and trigger transmission from the base station 20.

Alternatively, the terminal 10 may expect that there is at least one assignment of A-SRS, A-CSI-RS, A-TRS, or PRACH, based on an implicit notification (e.g., a PDCCH DMRS pattern, a Radio Network Temporary Identifier (RNTI) value, a search space in which the PDCCH is transmitted) other than the content of the control information (e.g., DCI).

A PRACH may be triggered when a PUSCH is scheduled, and a Timing Advance (TA) may be indicated to the terminal 10 by the second control information (for example, 2nd trigger DCI) after the control information (e.g., DCI) for assigning a PDSCH reception resource or a PUSCH transmission resource in the SCell. The terminal 10 need not apply a TA to a UL transmission prior to the 2nd trigger. Alternatively, a TA may not be applied at all in the SCell described above. Alternatively, a TA before updating (previously used TA on the carrier) may be applied. Alternatively, the terminal 10 may autonomously update the TA based on a change in the position information of the terminal 10 or the like.

When the above-described condition 1 is applied, the DCI transmitted on the second serving cell that assigns the PDSCH reception resource or the PUSCH transmission resource in the first serving cell also has a role of activating the first serving cell. Accordingly, a minimum gap time between the time resource to which the data signal or the reference signal is allocated and the time resource to receive the DCI (or the time resource for monitoring the DCI) may be specified (no resource is allocated in the gap time). The minimum gap may be assumed to be at least shorter than the above-described SCell activation delay.

A transmission configuration indication (TCI) state is a parameter for transmitting a notification of the QCL assumption from the base station 20 to the terminal 10. The above-described scheduling DCI need not include an explicit TCI state indication. In this case, the terminal 10 may determine the QCL assumption from the result of the RS transmission and reception. Alternatively, the terminal 10 may expect that an indication of the TCI state is transmitted by another DCI (2nd trigger).

For example, the terminal 10 may determine (or provisionally determine) the transmission beam (a candidate for the transmission beam) taking into account the amount of movement/rotation since the previous communication, and transmit the A-SRS. The base station 20 may determine the beam based on the reception of the A-SRS and transmit the A-CSI-RS/A-TRS, and the terminal 10 may determine the receive (transmit) beam and receive (transmit) the data.

The terminal 10 may report, to the base station 20, whether high speed RS transmission/reception operation can be performed on the SCell based on the cross-carrier scheduling indication, as the capability.

The terminal 10 may, for example, report, to the base station 20, whether the above-described operation is applicable, for each frequency band or each frequency band combination (PCell (Primary Cell)-SCell).

In addition, the terminal 10 may include, in the capability, UE capability information on autonomous beam correction (for example, information indicating whether an autonomous beam correction can be performed based on the amount of movement/rotation of the terminal 10) and/or UE capability information on autonomous TA correction (for example, information indicating whether an autonomous TA correction can be performed based on the movement and/or rotation of the terminal 10), and the terminal 10 may report the capability to base station 20.

(Device Configuration)

Next, a functional configuration example of the terminal 10 and the base station 20 that execute the processing operation described above is described. The terminal 10 and the base station 20 have all the functions described in the embodiments. However, the terminal 10 and the base station 20 may have only a part of all the functions described in the embodiments. The terminal 10 and the base station 20 may be collectively referred to as a communication device.

<Terminal>

Figure 7:
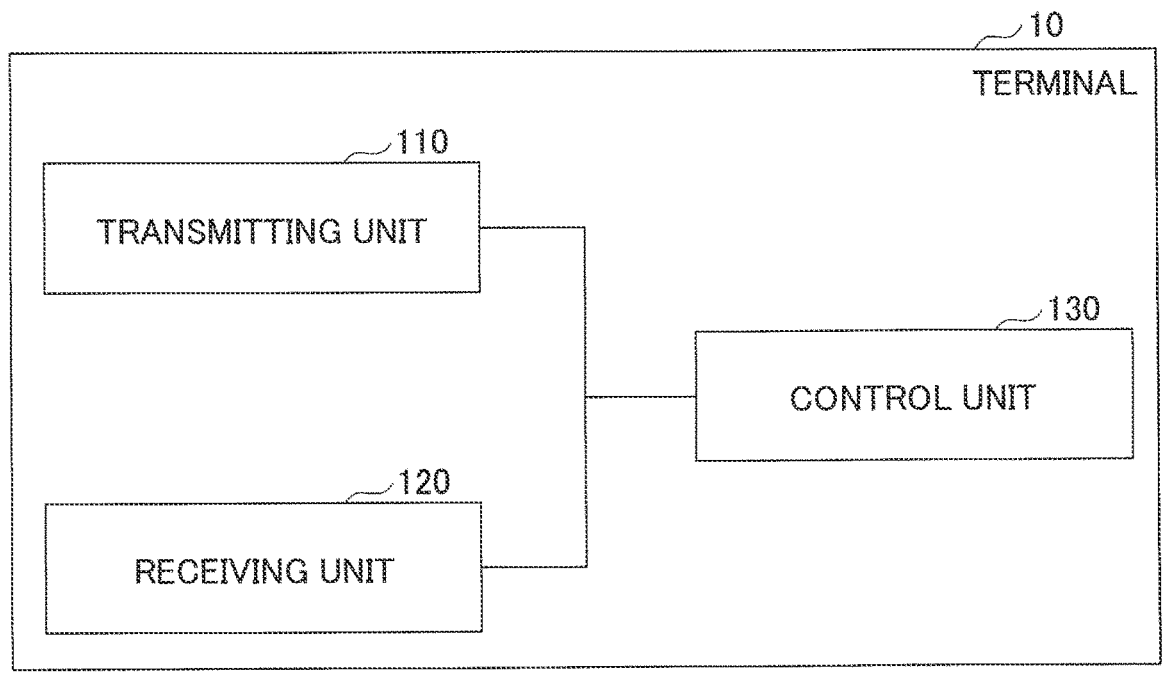
FIG. 7 is a diagram illustrating an example of a functional configuration of a terminal.

FIG. 7 is a diagram illustrating an example of a functional configuration of the terminal 10. As illustrated in FIG. 7, the terminal 10 includes a transmitting unit 110, a receiving unit 120, and a control unit 130. The functional configuration illustrated in FIG. 7 is illustrative only. A functional division and the names of the functional units may be any division and name as long as the operation according to the embodiments can be executed. Note that, the transmitting unit 110 may be referred to as a transmitter, and the receiving unit 120 may be referred to as a receiver.

The transmitting unit 110 creates transmission from transmission data, and wirelessly transmits the transmission signal. The transmitting unit 110 may form one or a plurality of beams. The receiving unit 120 wirelessly receives various signals, and acquires a signal of a higher layer from a received physical layer signal. In addition, the receiving unit 120 includes a measurement unit that performs measurement of a signal that is received to obtain received power or the like.

The control unit 130 performs control of the terminal 10. Note that, a function of the control unit 130 which relates to transmission may be included in the transmitting unit 110, and a function of the control unit 130 which relates to reception may be included in the receiving unit 120.

For example, the control unit 130 of the terminal may expect that the terminal 10 does not perform an operation corresponding to the first serving cell for which cross-carrier scheduling is configured and PDCCH monitoring is not configured, unless a PDSCH reception resource or a PUSCH transmission resource for the first serving cell is assigned by the control information (e.g., DCI) transmitted on the second serving cell (i.e., a serving cell other than the first serving cell). In this case, suppose that a PDSCH reception resource or a PUSCH transmission resource for the first serving cell is assigned to the terminal 10 by the control information (e.g., DCI) transmitted on the second serving cell. At this time, even if the control information does not include a specific indication, the control unit 130 of the terminal 10 may expect that at least one of an aperiodic CSI-RS (A-CSI-RS), an aperiodic tracking reference signal (A-TRS), an aperiodic sounding reference signal (A-SRS), or a Physical Random Access Channel (PRACH) is triggered.

<Base Station 20>

Figure 8:
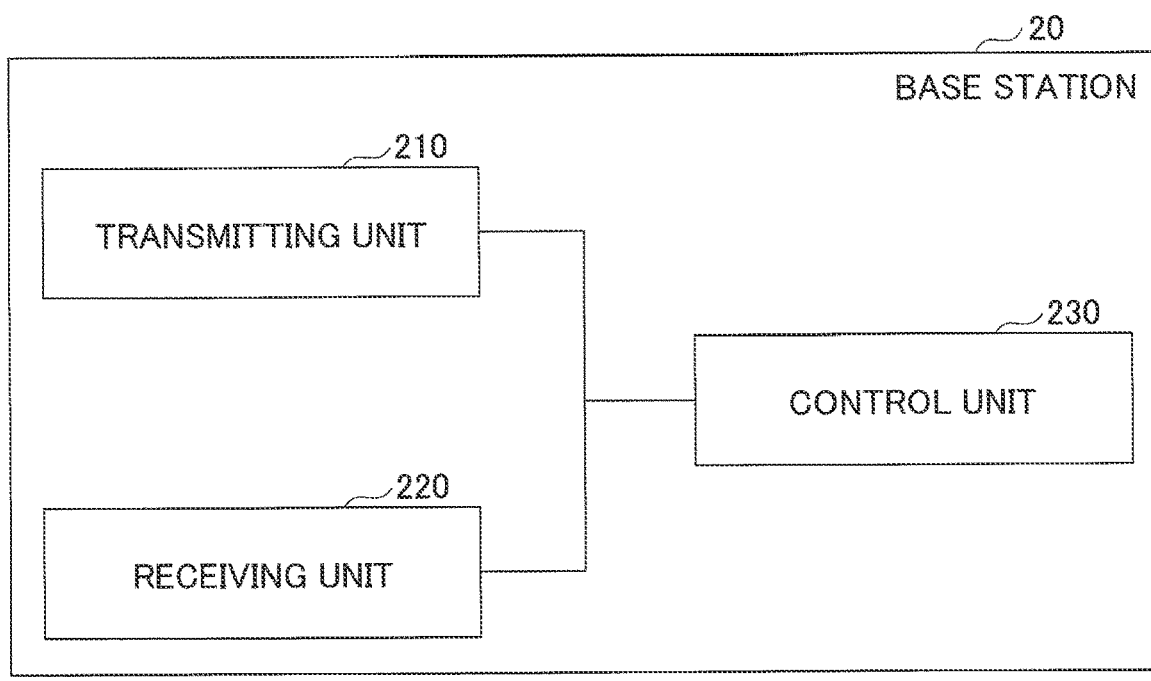
FIG. 8 is a diagram illustrating an example of a functional configuration of a base station.

FIG. 8 is a diagram illustrating an example of a functional configuration of the base station 20. As illustrated in FIG. 8, the base station 20 includes a transmitting unit 210, a receiving unit 220, and a control unit 230. A functional configuration illustrated in FIG. 8 is illustrative only. A functional division and the names of the functional units may be any division and name as long as the operation according to the embodiments can be executed. Note that, the transmitting unit 210 may be referred to as a transmitter, and the receiving unit 220 may be referred to as a receiver.

The transmitting unit 210 includes a function of generating a signal to be transmitted to the terminal 10 side, and wirelessly transmitting the signal. The receiving unit 220 includes a function of receiving various signals transmitted from the terminal 10, and acquiring, for example, information of a higher layer from the received signals. In addition, the receiving unit 220 includes a measurement unit that performs measurement of a signal that is received to obtain received power or the like.

The control unit 230 performs control of the base station 20. Note that, a function of the control unit 230 which relates to transmission may be included in the transmitting unit 210, and a function of the control unit 230 which relates to reception may be included in the receiving unit 220.

For example, the transmitting unit 210 of the base station 20 may transmit, to the terminal 10 on the second serving cell, DCI including information for assigning a PDSCH reception resource or a PUSCH transmission resource for the first serving cell. The receiving unit 220 of the base station 20 may receive the A-SRS in the second serving cell, and the control unit 230 of the base station 20 may estimate a beam and/or CSI based on the reciprocity of the radio wave propagation path. The transmitting unit 210 of the base station 20 may transmit data to the terminal 10 on the second serving cell based on the estimated beam and/or CSI.

<Hardware Configuration>

The block diagrams (FIG. 7 and FIG. 8) which are used in description of the embodiments illustrate blocks in a functional unit. The functional blocks (components) are implemented by a combination of hardware and/or software. In addition, means for implementing respective functional blocks is not particularly limited. That is, the respective functional blocks may be implemented by one device in which a plurality of elements are physically and/or logically combined. In addition, two or more devices, which are physically and/or logically separated from each other, may be directly and/or indirectly connected (for example, in a wired manner and/or a wireless manner), and the respective functional blocks may be implemented by a plurality of the devices.

Figure 9:
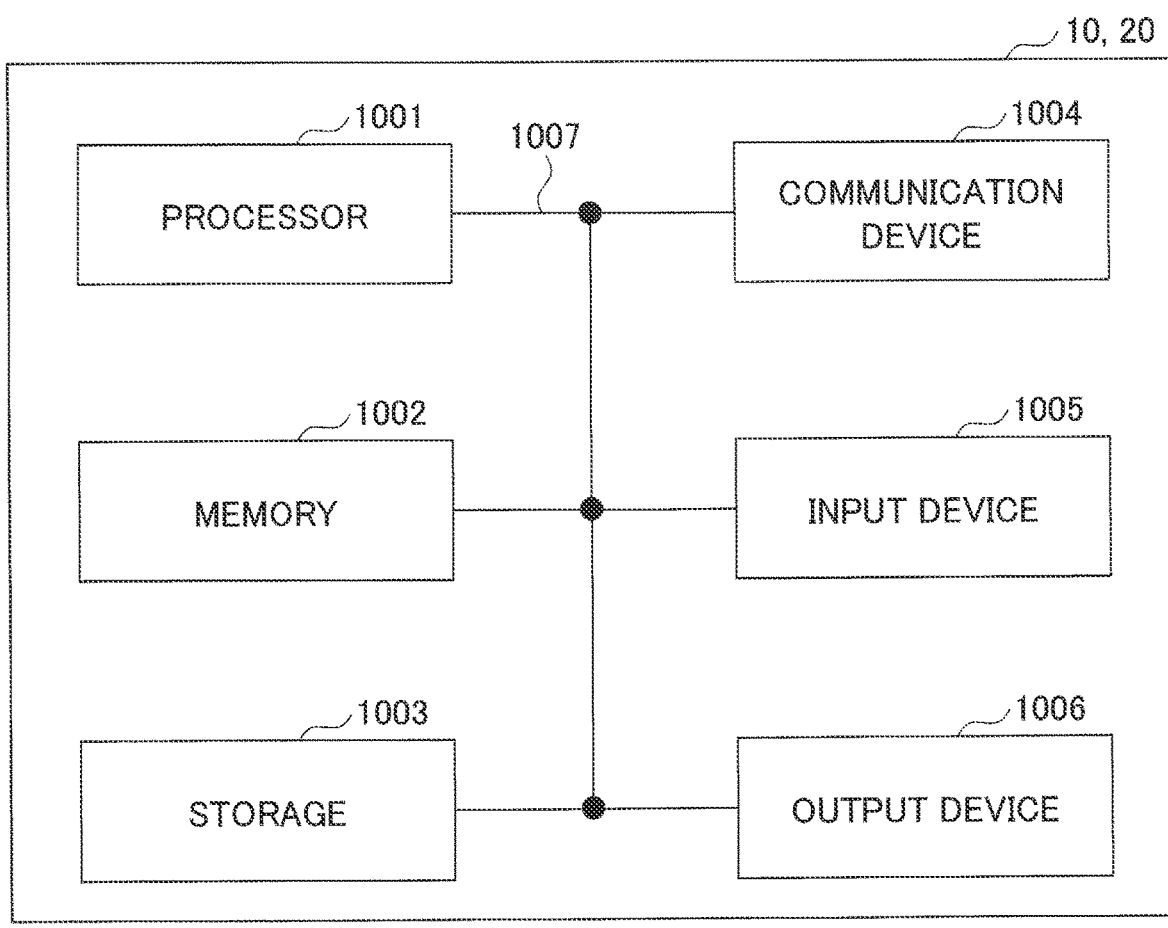
FIG. 9 is a diagram illustrating an example of the hardware configuration of the terminal and the base station.

For example, each of the terminal 10 and the base station 20 according to an embodiment of the present invention may function as a computer performing the process according to the embodiments. FIG. 9 is a diagram illustrating an example of a hardware configuration of the terminal 10 and the base station 20 according to the embodiments. Each of the above-described terminal 10 and base station 20 may be physically configured as a computer device including a processor 1001, a memory 1002, an storage 1003, a communication unit 1004, an input unit 1005, an output unit 1006, a bus 1007, and the like.

In the following description, the term "device" can be replaced with a circuit, a device, a unit, or the like. The hardware configuration of the terminal 10 and the base station 20 may include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication unit 1004, and reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module, or data from the storage 1003 and/or the communication unit 1004 to the memory 1002, and executes various processes according to these. As the program, a program is used that causes a computer to execute at least a part of the operations described in the above-described embodiments. For example, the transmitting unit 110, the receiving unit 120, and the control unit 130 of the terminal 10 illustrated in FIG. 7 may be implemented by a control program that is stored in the memory 1002 and that is operated by the processor 1001. Furthermore, for example, the transmitting unit 210, the receiving unit 220, and the control unit 230 of the base station 20 illustrated in FIG. 8 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, or the like, which can be executed for implementing the process according to one embodiment of the present invention.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The storage 1003 may be referred to as an auxiliary storage device. The above-described storage medium may be, for example, a database including the memory 1002 and/or the storage 1003, a server, or any other suitable medium.

The communication unit 1004 is hardware (transmitting and receiving device) for performing communication between computers through a wired network and/or a wireless network, and is also referred to, for example, as a network device, a network controller, a network card, a communication module, or the like. For example, the transmitting unit 110 and the receiving unit 120 of the terminal 10 may be implemented by the communication unit 1004. Furthermore, the transmitting unit 210 and the receiving unit 220 of the base station 20 may be implemented by the communication unit 1004.

The input unit 1005 is an input device (e.g., a keyboard, a mouse, a microphone, a switch, a button, and/or a sensor) that receives an external input. The output unit 1006 is an output device (e.g., a display, a speaker, and/or an LED lamp) that performs output toward outside. The input unit 1005 and the output unit 1006 may be configured to be integrated (e.g., a touch panel).

Each device, such as the processor 1001 and the memory 1002, is also connected by the bus 1007 for communicating information. The bus 1007 may be formed of a single bus or may be formed of different buses between devices.

The terminal 10 and the base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented by at least one of these hardware components.

CONCLUSION OF THE EMBODIMENTS

In the specification, at least the terminal and the base station described below are disclosed.

A terminal including a receiving unit that receives control information transmitted on a second cell, the control information including information used to assign a resource for a downlink shared channel reception or a resource for an uplink shared channel transmission in a first cell; and a control unit that determines at least one of a measurement of a channel state information reference signal (CSI-RS), a measurement of a tracking reference signal (TRS), a transmission of a sounding reference signal (SRS), or a transmission of a physical random access channel (PRACH) is triggered, regardless of a content of information other than the information used to assign the resource included in the control information.

According to the above-described configuration, the activation delay of the deactivated SCell can be reduced.

Upon detecting that the receiving unit does not receive the control information transmitted on the second cell, the control unit may determine that an operation corresponding to the first cell is not to be performed.

According to the above-described configuration, in the deactivated state of the SCell, the terminal can save power consumption, for example, by setting the radio circuit for the SCell to the sleep mode.

A frequency band of the second cell may be higher than or equal to a frequency band of a Frequency Range 2 (FR2), in a frequency range formed of a Frequency Range 1 (FR1) that is a low frequency band of a New Radio system and the FR2 that is a high frequency band of the New Radio system.

According to the above-described configuration, the SCell can be applied to high-speed data transmission and reception.

The control information transmitted on the second cell may include information indicating a resource set to be triggered.

According to the above-described configuration, the resource set to be triggered can be explicitly specified.

A base station including a transmitting unit that transmits control information on a second cell, the control information including information used to assign a resource for a downlink shared channel reception or a resource for an uplink shared channel transmission in a first cell; and a control unit that determines at least one of a measurement of a channel state information reference signal (CSI-RS), a measurement of a tracking reference signal (TRS), a transmission of a sounding reference signal (SRS), or a transmission of a physical random access channel (PRACH) is triggered by the transmission of the control information, regardless of a content of information other than the information used to assign the resource included in the control information.

According to the above-described configuration, the activation delay of the deactivated SCell can be reduced.

SUPPLEMENTAL EMBODIMENT

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 10 and the base station 20 are described using the functional block diagrams, but such devices may be implemented by hardware, software, or a combination thereof. Software executed by the processor included in the terminal 10 according to the embodiments of the present invention and software executed by the processor included in the base station 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present specification and may be provided by any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present specification may be applied to Long Term Evolution (LTE), LTE-advanced (LTE-A), SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended based on these standards.

The processing procedures, the sequences, the flowcharts, and the like of the respective aspects/embodiments described in the present specification may be reversed in order provided that there is no contradiction. For example, the method described in the present specification presents elements of various steps with an exemplary order and is not limited to a presented specific order.

In the present specification, a specific operation to be performed by the base station 20 may be performed by an upper node in some cases. In the network including one or more network nodes including the base station 20, various operations performed for communication with the terminal 10 can be obviously performed by the base station 20 and/or any network node (for example, an MME, an S-GW, or the like is considered, but it is not limited thereto) other than the base station 20. A case is exemplified above in which there is one network node other than the base station 20. The one network node may be a combination of a plurality of other network nodes (e.g., MME and S-GW).

The aspects/embodiments described in this specification may be used alone, in combination, or switched with implementation.

The terminal 10 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station 20 may be defined by those skilled in the art as a NodeB (NB), enhanced node B (eNB), base station, gNB, or several appropriate terminologies.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not assumed that the UE transmits and receives a predetermined signal/channel outside an active BWP. Further, a "cell," a "carrier," or the like in the present disclosure may be replaced with a "BWP."

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology. The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like. The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology. The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B. Any one of a radio frame, a subframe, a slot, a mini slot, and a symbol indicates a time unit for transmitting a signal. As a radio frame, a subframe, a slot, a mini slot, and a symbol, different names corresponding to them may be used. For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 10) to each terminal 10 in units of TTIs. The definition of the TTI is not limited thereto. The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI. When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled. A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like. Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology. Furthermore, a time domain of an RB may include one or more symbols and may be a length of one slot, one mini slot, one subframe, or one TTI. One TTI, one subframe, or the like may be formed of one or more resource blocks. Furthermore, one or more RBs may be referred to as a physical resource block (PRB: Physical RB), a sub carrier group (SCG: Sub-Carrier Group), a resource element group (REG: Resource Element Group), a PRB pair, an RB pair, or the like. Furthermore, the resource block may be formed of one or more resource elements (RE: Resource Element). For example, one RE may be a radio resource region of one subcarrier and one symbol.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The description "based on" in this specification does not represent "only based on" unless otherwise stated. In other words, description of "based on" represents both "only based on" and "at least based on."

In this specification or the appended claims, in a case where "include," "including," and a modification thereof are used, these terms are intended as comprehensive terms similar to "comprising." In addition, a term "or" that is used in this specification and the appended claims is not intended as an exclusive OR.

In the entire present disclosure, for example, when an article such as "a," "an," and "the" in English is added by a translation, the article may include multiple things, unless the context explicitly indicates that the article does not include the multiple things.

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS 10 terminal
110 transmitting unit
120 receiving unit
130 control unit
20 base station
210 transmitting unit
220 receiving unit
230 control unit
1001 processor
1002 memory
1003 storage
1004 communication device
1005 input device
1006 output device

The invention claimed is:

1. A terminal comprising:
a receiver that receives control information transmitted on a second cell, the control information including information used to assign a resource for a downlink shared channel reception or a resource for an uplink shared channel transmission in a first cell; and
a processor that determines at least one of a measurement of a channel state information reference signal (CSI-RS), a measurement of a tracking reference signal (TRS), a transmission of a sounding reference signal (SRS), or a transmission of a physical random access channel (PRACH) is triggered, regardless of a content of information other than the information used to assign the resource included in the control information,
wherein a frequency band of the second cell is in a Frequency Range 1 (FR1), in a frequency range formed of the FR1 that is a low frequency band of a New Radio system and a Frequency Range 2 (FR2) that is a high frequency band of the New Radio system, and a frequency band of the first cell is higher than or equal to a frequency band of the FR2,
wherein the terminal further includes a first radio circuit for the frequency band of the first cell and a second radio circuit for the frequency band of the second cell, and
wherein, during an operation of the terminal, the second radio circuit always monitors control information, and the first radio circuit is turned off except for a timing at which there is data traffic.

2. The terminal according to claim 1, wherein, upon detecting that the receiver does not receive the control information transmitted on the second cell, the processor determines that an operation corresponding to the first cell is not to be performed.

3. The terminal according to claim 1, wherein the control information transmitted on the second cell includes information indicating a resource set to be triggered.

4. A radio communication system comprising:
a base station; and
a terminal,
wherein the base station includes a transmitter that transmits control information on a second cell, the control information including information used to assign a resource for a downlink shared channel reception or a resource for an uplink shared channel transmission in a first cell,
wherein the terminal includes:
a receiver that receives the control information; and
a processor that determines at least one of a measurement of a channel state information reference signal (CSI-RS), a measurement of a tracking reference signal (TRS), a transmission of a sounding reference signal (SRS), or a transmission of a physical random access channel (PRACH) is triggered, regardless of a content of information other than the information used to assign the resource included in the control information,
wherein a frequency band of the second cell is in a Frequency Range 1 (FR1), in a frequency range formed of the FR1 that is a low frequency band of a New Radio system and a Frequency Range 2 (FR2) that is a high frequency band of the New Radio system, and a frequency band of the first cell is higher than or equal to a frequency band of the FR2,
wherein the terminal further includes a first radio circuit for the frequency band of the first cell and a second radio circuit for the frequency band of the second cell, and
wherein, during an operation of the terminal, the second radio circuit always monitors control information, and the first radio circuit is turned off except for a timing at which there is data traffic.

* * * * *